US010122451B2

(12) United States Patent
Ankarali et al.

(10) Patent No.: US 10,122,451 B2
(45) Date of Patent: Nov. 6, 2018

(54) INFORMATION BEAMFORMING FOR VISIBLE LIGHT COMMUNICATION

(71) Applicant: UNIVERSITY OF SOUTH FLORIDA, Tampa, FL (US)

(72) Inventors: Zekeriyya Esat Ankarali, Tampa, FL (US); Huseyin Arslan, Tampa, FL (US); Alphan Sahin, Seaford, NY (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 15/108,821

(22) PCT Filed: Jan. 15, 2016

(86) PCT No.: PCT/US2016/013519
§ 371 (c)(1),
(2) Date: Jun. 29, 2016

(87) PCT Pub. No.: WO2016/182606
PCT Pub. Date: Nov. 17, 2016

(65) Prior Publication Data
US 2018/0115365 A1 Apr. 26, 2018

Related U.S. Application Data

(60) Provisional application No. 62/159,615, filed on May 11, 2015.

(51) Int. Cl.
*H04B 10/00* (2013.01)
*H04B 10/116* (2013.01)
(Continued)

(52) U.S. Cl.
CPC ......... *H04B 10/116* (2013.01); *H04B 10/502* (2013.01); *H04B 10/54* (2013.01); *H04B 10/61* (2013.01)

(58) Field of Classification Search
CPC .... H04B 10/116; H04B 10/502; H04B 10/54; H04B 10/61
(Continued)

(56) References Cited

U.S. PATENT DOCUMENTS 7,583,901 B2    9/2009  Nakagawa
8,521,035 B2    8/2013  Knapp
(Continued)

OTHER PUBLICATIONS

"Fundamental analysis for visible-light communication system using LED lights" by Komine et al., IEEE Transactions on Consumer Electronics, 50.1 (2004): 100-107, Feb. 2004.
(Continued)

*Primary Examiner* — Amritbir Sandhu
(74) *Attorney, Agent, or Firm* — Thomas | Horstemeyer, LLP

(57) ABSTRACT

Examples of information beamforming technology for visible light communication (VLC) systems are provided. A VLC system can include an array of light emitting diode (LED) elements that can emit omni-directional light and control circuitry that can control individual LED elements of the array to sinusoidally vary the intensity of the omni-directional light emitted from the individual LED elements. A data carrying light beam can be generated within an information beam region by constructively combining sinusoidal intensity variations of the emitted omni-directional light and uniform intensity light can be generated outside the information beam region by destructively combining the sinusoidal intensity variations. The VLC system can include an optical detector that can detect sinusoidal intensity variations of a data carrying light beam and generate an output signal corresponding to the sinusoidal intensity variations. The output signal can be converted into digital symbols corresponding to the detected sinusoidal intensity variations.

20 Claims, 4 Drawing Sheets

(51) Int. Cl.
  *H04B 10/50* (2013.01)
  *H04B 10/54* (2013.01)
  *H04B 10/61* (2013.01)

(58) Field of Classification Search
  USPC .................................. 398/130, 182, 183, 186
  See application file for complete search history.

(56) References Cited

U.S. PATENT DOCUMENTS

| | | | |
|---|---|---|---|
| 9,413,457 B2* | 8/2016 | Pederson | G07C 9/00158 |
| 9,791,542 B2* | 10/2017 | Ryan | G01S 5/16 |
| 9,791,543 B2* | 10/2017 | Ryan | G01S 5/16 |
| 9,846,222 B2* | 12/2017 | Ryan | G01S 5/16 |
| 2006/0092491 A1* | 5/2006 | Wang | G02B 5/1842 |
| | | | 359/196.1 |
| 2007/0024571 A1* | 2/2007 | Maniam | H04B 10/1141 |
| | | | 345/102 |
| 2011/0008062 A1* | 1/2011 | Ashdown | H04B 10/1141 |
| | | | 398/212 |
| 2011/0069960 A1* | 3/2011 | Knapp | H04L 12/43 |
| | | | 398/103 |
| 2011/0121734 A1* | 5/2011 | Pape | F21V 25/12 |
| | | | 315/86 |
| 2012/0087676 A1* | 4/2012 | Lim | H04B 10/116 |
| | | | 398/182 |
| 2012/0155889 A1 | 6/2012 | Kim et al. | |
| 2013/0236183 A1 | 9/2013 | Chao | |
| 2013/0266325 A1 | 10/2013 | Giustiniano et al. | |
| 2014/0159586 A1 | 6/2014 | Kido | |
| 2016/0047890 A1* | 2/2016 | Ryan | G01S 5/16 |
| | | | 398/118 |
| 2016/0119747 A1* | 4/2016 | Ryan | G01S 5/16 |
| | | | 398/118 |
| 2016/0173200 A1* | 6/2016 | Chaillan | H04B 10/116 |
| | | | 398/115 |
| 2017/0104532 A1* | 4/2017 | Stout | H04B 10/1149 |
| 2018/0007247 A1* | 1/2018 | Aggarwal | F21S 11/00 |

OTHER PUBLICATIONS

"Performance improvement of visible light communications using optical beamforming" by Kim et al., 2013 Fifth International Conference on Ubiquitous and Future Networks (ICUFN), IEEE, Jul. 2013, pp. 362-365.

"Mitigation of inter-cell interference utilizing carrier allocation in visible light communication system" by Kim et al., IEEE Communications Letters, vol. 16, No. 4, pp. 526-529, Apr. 2012.

"A hybrid Radio Frequency and broadcast Visible Light Communication system" by Rahaim et al., GLOBECOM Workshops, IEEE, pp. 792-796, Dec. 2011.

"Visible light communications for 5G wireless networking systems: from fixed to mobile communications" by Wu et al., IEEE Network, vol. 28 No. 6, pp. 41-45, Nov. 2014.

"Visible light communication based on space-division multiple access optical beamforming" by Kim et al., Chinese Optics Letters, vol. 12, No. 12, pp. 120601-120604, Dec. 2014.

"Rate-adaptive visible light communication at 500Mb/s arrives at plug and play" by Langer et al., SPIE Newsroom, Nov. 2013.

"Visual light landmarks for mobile devices" by Niranjini et al., IEEE Proceedings of the 13th international symposium on information processing in sensor networks, Apr. 2014, pp. 249-260.

International Search Report and Written Opinion in related co-pending PCT Application No. PCT/US2016/013519, dated Mar. 11, 2016.

* cited by examiner

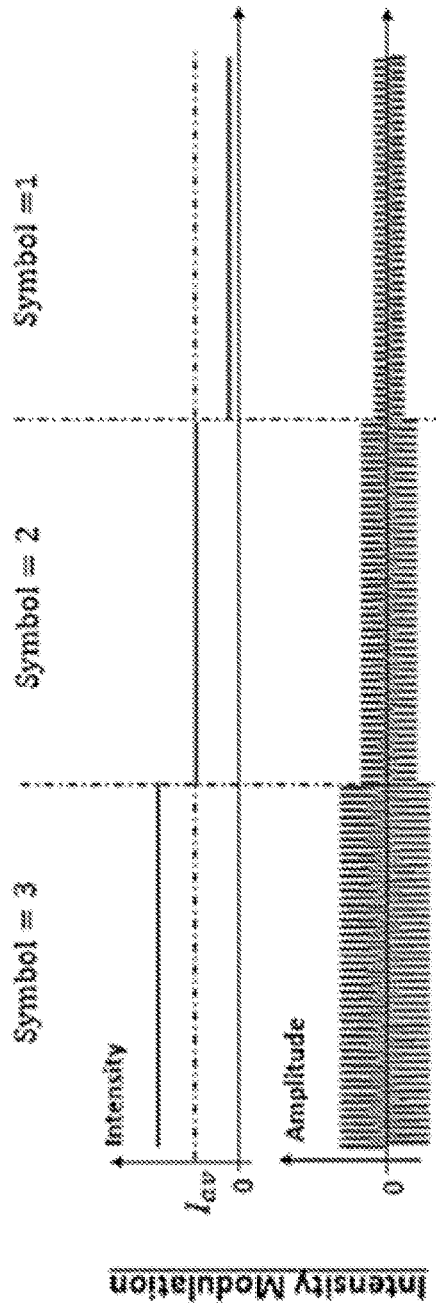
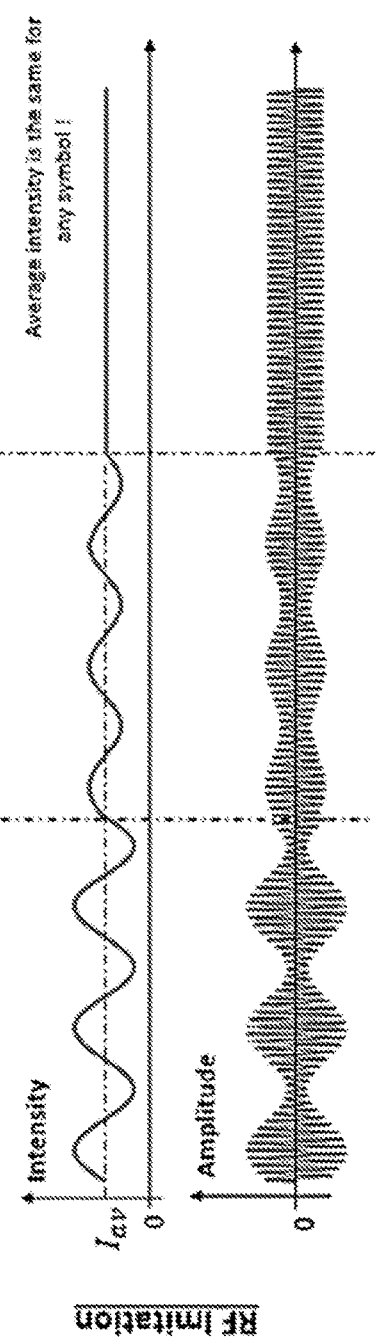
FIG. 4A
FIG. 4B

INFORMATION BEAMFORMING FOR VISIBLE LIGHT COMMUNICATION

CROSS-REFERENCE TO RELATED APPLICATION

This application is the 35 U.S.C. § 371 national stage of, and claims priority to and the benefit of, PCT application PCT/US2016/013519, filed Jan. 15, 2016, which claims priority to and the benefit of U.S. Provisional Application No. 62/159,615, filed on May 11, 2015, herein incorporated by reference in their entirety.

BACKGROUND

Radio frequency (RF) communications has enabled the efficient transfer of information. The number of people who use of wireless devices such as cellular telephones, laptops, and tablets to access information over RF frequency bands continues to increase. As the volume and size of data files continues to grow, available transmission rates and channel capacities cannot suffice anymore. Alternative methods of data transmission between devices are being examined.

SUMMARY

Embodiments of the present disclosure are related to information beamforming for visible light.

In one embodiment, among others, a visible light communication (VLC) system comprises an array of light emitting diode (LED) elements configured to emit omni-directional light; and control circuitry configured to control individual LED elements of the array of LED elements to sinusoidally vary an intensity of the omni-directional light emitted from the individual LED elements. A data carrying light beam can be generated within an information beam region by constructively combining sinusoidal intensity variations of the emitted omni-directional light and uniform intensity light can be generated outside the information beam region by destructively combining the sinusoidal intensity variations of the emitted omni-directional light.

In one or more aspects of these embodiments, the VLC system can comprise an optical receiver configured to receive the data carrying light beam; and processing circuitry configured to convert sinusoidal variations of the data carrying light beam into corresponding digital symbols. The optical receiver can be a photodetector. The control circuitry can be configured to interface with a network device via a network. The control circuitry can be configured to convert digital to corresponding sinusoidal variations for symbol transmission over the data carrying light beam. The network can be a hardwired local network. The control circuitry can be configured to control amplitude and phase of the sinusoidal variations of the intensity to generate information symbols of a data carrying light beam in a defined or specified direction.

In one embodiment, a VLC system comprises an optical receiver configured to detect sinusoidal intensity variations of a received data carrying light beam within an information beam region and generate an output signal corresponding to the sinusoidal intensity variations. The information beam region can be generated by constructively combining the sinusoidal intensity variation of the omni-directional light emitted by an array of light emitting diode (LED) elements. The VLC system can comprise processing circuitry configured convert the output signal into digital symbols corresponding to the detected sinusoidal intensity variations. The optical receiver can be a photodetector. The processing circuitry can be configured to provide the digital symbols to a computing device communicatively coupled to the processing circuitry. Uniform intensity light can be generated outside the information beam region by destructively combining the sinusoidal intensity variation of the omni-directional light emitted by the array of LED elements.

In one embodiment, a light source comprising the visible light communication (VLC) system comprising an array of light emitting diode (LED) elements configured to emit omni-directional light; and control circuitry configured to control individual LED elements of the array of LED elements to sinusoidally vary an intensity of the omni-directional light emitted from the individual LED elements. The light source can comprise an optical receiver configured to detect sinusoidal intensity variations of a received data carrying light beam within an information beam region and generate an output signal corresponding to the sinusoidal intensity variations. The light source can be a light fixture. The light source can comprise a plurality of optical receivers.

In one embodiment, a method comprises illuminating a space with an array of light emitting diode (LED) elements configured to emit omni-directional light; and generating a data carrying light beam within an information beam region of the space by sinusoidally varying an intensity of the omni-directional light emitted from one or more LED elements of the array of LED elements, while simultaneously generating uniform intensity light outside the information beam region. The method can comprise receiving data transmitted over a network; and transmitting the data via the data carrying light beam by modulating the intensity of the omni-directional light emitted from the one or more LED elements. The method can comprise controlling amplitude and phase of the sinusoidal variations of the intensity to generate information symbols of a data carrying light beam in a defined or specified direction.

In one or more aspects of these embodiments, the method can comprise sensing intensity variations of the data carrying light beam; and generating an output signal corresponding to the intensity variations of the data carrying light beam. The method can comprise converting the output signal into digital symbols corresponding to the data transmitted over the network. The sinusoidal intensity variations of the omni-directional light can constructively combine within the information beam region and can destructively combine outside the information beam region.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A and 4B illustrate examples of the transmission of symbols in accordance with various embodiments of the present disclosure.

DETAILED DESCRIPTION

Figure 1:
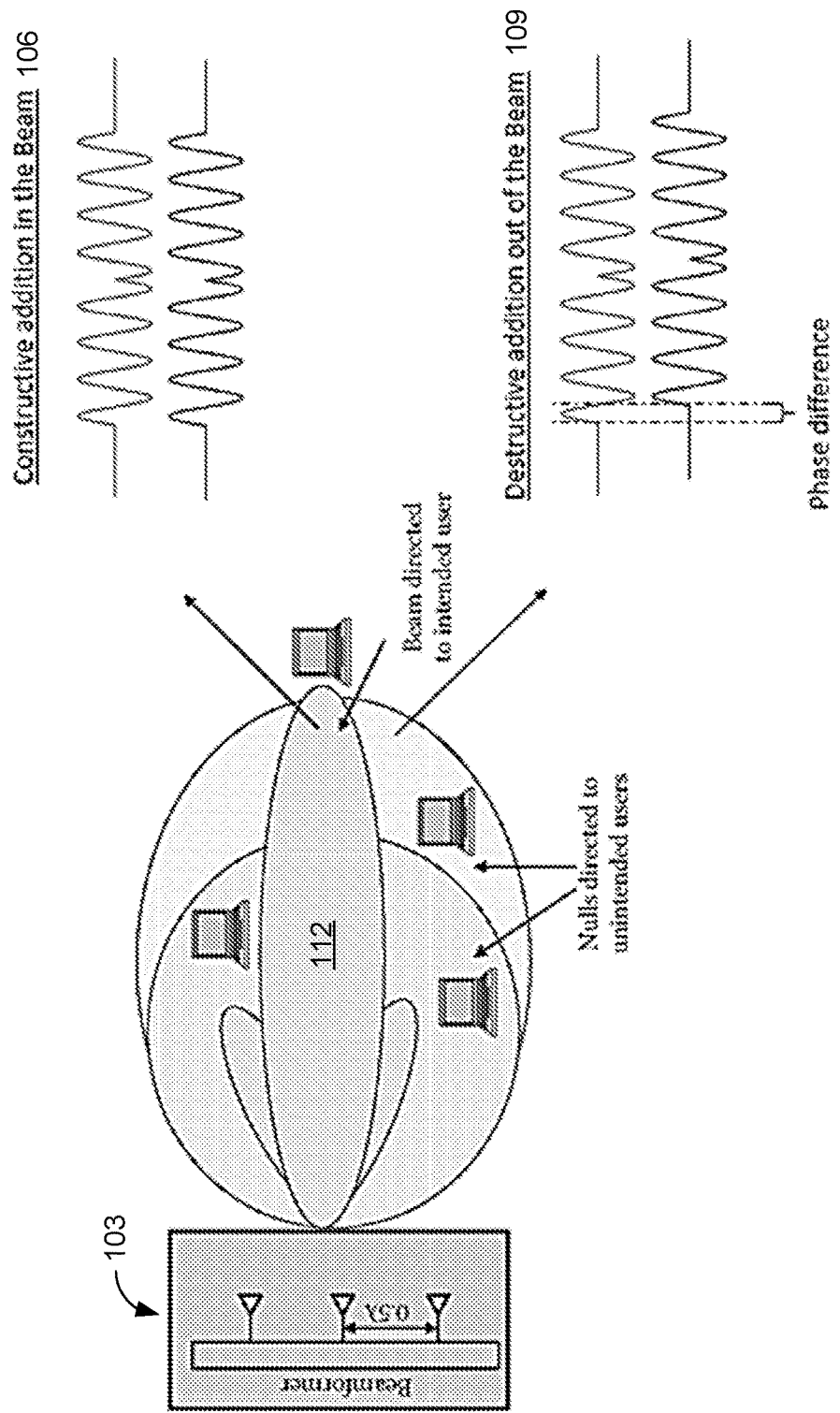
FIG. 1 is a graphical representation illustrating an example of RF beamforming using an array of antennas in accordance with various embodiments of the present disclosure.

Disclosed herein are various examples related to information beamforming for visible light communication (VLC). Reference will now be made in detail to the description of the embodiments as illustrated in the drawings, wherein like reference numbers indicate like parts throughout the several views.

Beamforming is a well-known technique for confining the signal power at a specific angular direction. FIG. 1 shows an example of RF beamforming using an array of antennas 103. Most generally, signals of a phased array of antennas 103 can be constructively combined at a specific angular direction while signals out of that angle cancel each other. This phenomenon can be explained with sinusoidal characteristics of RF signals. For instance, addition of two identical RF signals having no phase difference (as shown at 106 in FIG. 1) results in a strengthened signal while the same signals cancel each other if they have a 180° phase difference (as shown at 109 in FIG. 1). If the proper phase and amplitude values are specified for the signals that are broadcast from each antenna of the antenna array 103, a constructive addition region 112 of the signals can be determined, and thus the directionality of the signal can be controlled. Control of the transmitted signals can produce nulls that exclude unintended devices and users.

In visible light communications (VLC), the light is used for both illumination and data transmission. Conventionally, data transmission is achieved by modulating the intensity of the light. Since the intensity of the light changes very fast, human eyes do not sense a flickering effect due to the data transmission while the illumination is properly maintained. The beamforming strategy in RF communication is not feasible in VLC systems for two reasons. First, the natural frequency of the light is extremely high (e.g., between 400-484 THz for red light) to control the phase and amplitude of each signal. Second, the aforementioned beamforming method conflicts with homogenous illumination, which may not be an appropriate solution for VLC systems. While optical beamforming techniques that concentrate the light on a specific region exist, they utilize optical devices (e.g., a spatial light modulator or SLM) to control the direction of the concentrated light to send a stronger signal to a target point in space. Such methods may conflict with the illumination task of VLC and are not feasible in daily life.

Figure 2:
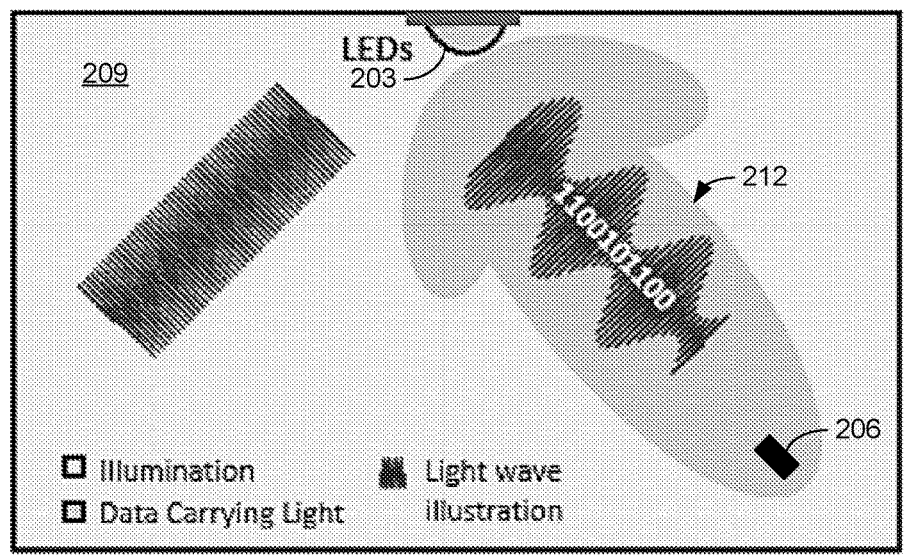
FIG. 2 illustrates an example of visible light communication (VLC) using information beamforming with an array of light emitting diodes (LEDs) in accordance with various embodiments of the present disclosure.

As illustrated in FIG. 2, arrays of light emitting diodes (LEDs) 203 are used in place of traditional light sources to provide omni-directional illumination. Compared to traditional light sources, the LEDs 203 exhibit longer life expectancy and high lighting efficiency. The LEDs 203 also allow for improved control over the transmitted light. The LEDs 203 can be controlled to modulate the emitted light at relatively high rates, enabling data transmission by the LEDs 203, which can be received by a photo-detector 206 or other optical receiver. By controlling individual elements of the array of LEDs 203, beamforming can be achieved without hurting the illumination provided by the LEDs 203. The intensity of the LED elements can be varied as a sinusoidal signal in order to broadcast omni-directional illumination 209 while simultaneously providing beamforming to communicate data in a specific information beam region 212 as depicted in FIG. 2. The variation of the light intensity can be converted to a sinusoidal current by, e.g., the photo-detector 206 or other optical receiver, which can then be processed as a regular received signal.

Figure 3:
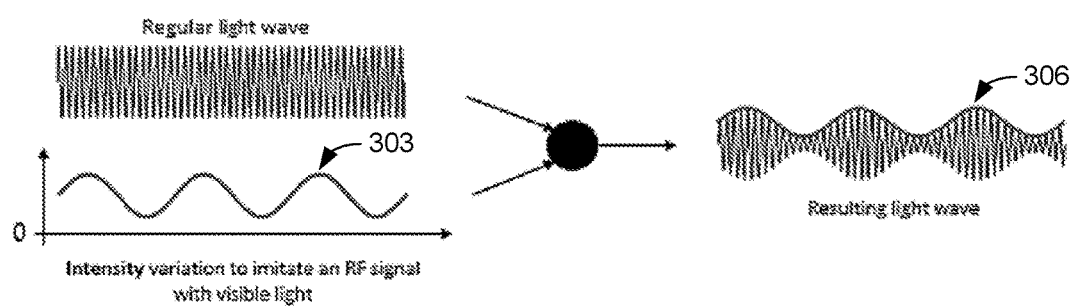
FIG. 3 illustrates an example of sinusoidal intensity variation of a light signal in accordance with various embodiments of the present disclosure.

As in radio frequency (RF) communications, data can be transmitted by the concentration of the transmitted light on a specific region. However, as previously mentioned, this can affect the homogeneous illumination. The use of phase-shift keying (PSK) modulation methods of the light has been previously proposed to prevent possible LED flickering because of the change in optical power (see, e.g., "Mitigation of inter-cell interference utilizing carrier allocation in visible light communication system" by Kim et al.). In this case, the intensity of the light is varied as a sinusoidal signal as illustrated in FIG. 3. By controlling an LED element based upon the sinusoidal signal 303, the intensity of the resulting light wave 306 varies sinusoidally as shown. The amplitude is represented by the variation in the amount of light intensity rather than the intensity itself, while the average optical power is kept constant.

Referring to FIGS. 4A and 4B, shown is an example of the transmission of symbols using the sinusoidal intensity variation. The symbols can be distinguished by transmitting at different variation levels, i.e., amplitudes, at a specific frequency as shown in FIG. 4A. Since the information is only represented by the sinusoidal intensity variation amount (amplitude of the variation) and possibly by the phase as shown in FIG. 4B, the average optical power remains constant for the symbols for any sinusoidal amplitude. Therefore, usage of any quadrature-amplitude modulation (QAM) methods are also enabled in our technique without any risk of flickering.

Figure 5A:
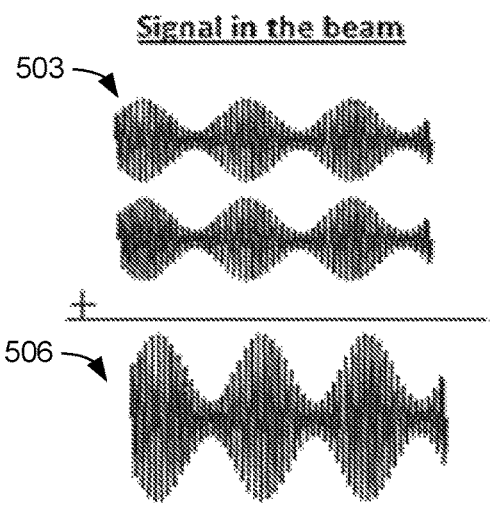
FIGS. 5A and 5B illustrate examples of constructive and destructive combination of the sinusoidally varying light signals in accordance with various embodiments of the present disclosure.

With the disclosed sinusoidal variation technique, information beamforming for VLC can be performed in a fashion similar to regular RF beamforming by deploying an array of LEDs 203 (FIG. 2). As in RF beamforming with an array of antennas 103 (FIG. 1), controlling the phase and amplitude of the sinusoidal variations of individual elements of the array of LEDs allows for constructive and destructive interference of the transmitted light signals. As shown in FIG. 5A, constructively combined visible light signals 503 in the information beam region 212 (FIG. 1) results in data carrying light 506 whose intensity variation becomes more obvious as the interference combines to amplify the signal variation. The resulting data carrying light signal 506 with more intensity variation corresponds to a stronger signal at the photo-detector 206 (FIG. 2) or other optical receiver.

Figure 5B:
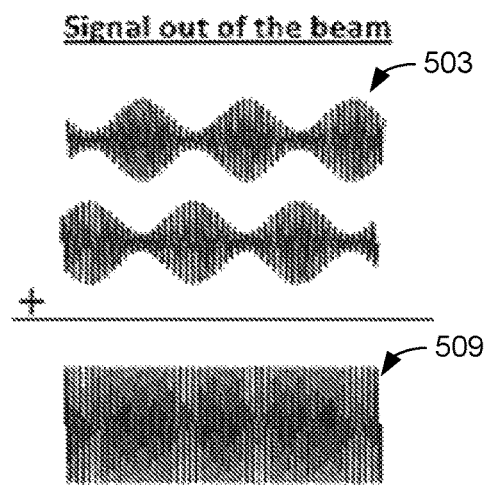

On the other hand, visible light signals 503 outside the information beam region 212 are destructively combined to cancel the light density variation of each other resulting in uniform intensity light 509, while the average density is still kept the same as the light in the beam as illustrated in FIG. 5B. Consequently, while information is directed to a specific information beam region 212, the intensity of the light remains constant outside of the information beam region 212. Since average intensity is the same for the light inside and outside of the information beam region 212, a homogeneous illumination is provided in the environment.

Figure 6:
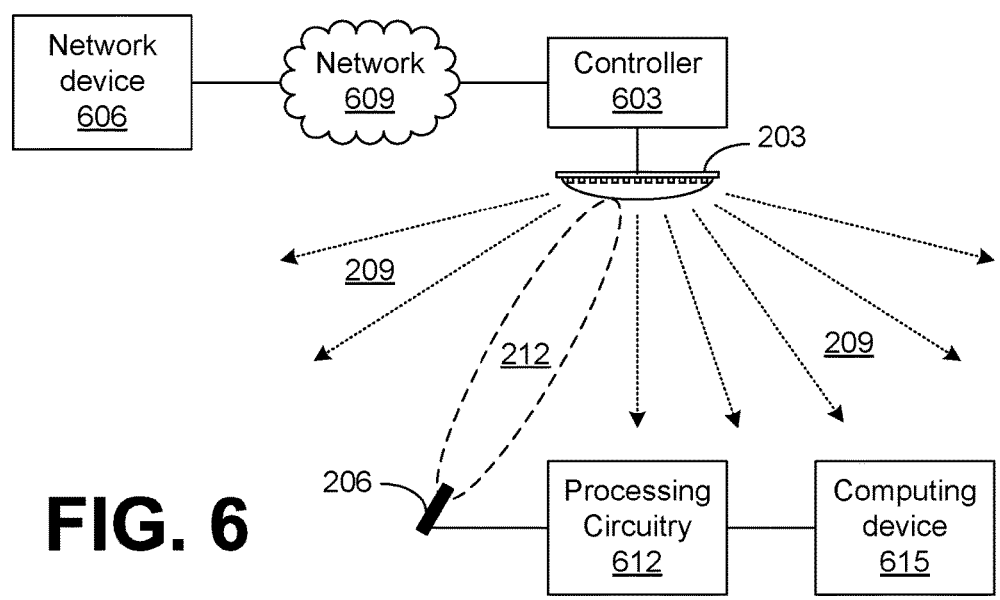
FIG. 6 is a graphical representation of a VLC system utilizing sinusoidal intensity variation for information communication between devices in accordance with various embodiments of the present disclosure.

Referring next to FIG. 6, shown is an example of a VLC system 600 that can utilize sinusoidal intensity variation of the light signals for information communication. The VLC system 600 includes a controller 603 configured to control operation of an array of LED elements 203 that is positioned within a space. For example, the array of LED elements 203 may be a fixture mounted to a ceiling of an office or work space, living space or residence, commercial space (e.g., airport, mall, etc.) or other publically accessible area. The controller 603 can control individual LED elements of the array 203 to sinusoidally vary the intensity of the light produced by the individual LED elements. By controlling the phase and amplitude of the sinusoidal intensity variations, the omni-directional light emitted from the individual LED elements can be constructively combined to generate a data carrying light beam within an information beam region 212, while the omni-directional light outside the information beam region 212 is destructively combined to generate omni-directional illumination 209 with a uniform intensity light.

The controller 603 can act as an interface for establishing a link between a network device 606 (e.g., a computing device, server, gateway, router, etc.) through a network 609. The network 113 may comprise, for example, the Internet, intranets, extranets, wide area networks (WANs), local area networks (LANs), wired networks, wireless networks, or other suitable networks, etc., or any combination of two or more such networks. In other embodiments, the controller 603 may interface directly with a computer through a hardware connection or other communication link. In some implementations, the controller 603 and array of LED elements 203 may be integrated into a single unit such as, e.g., a light fixture, lamp, or other appropriate lighting device. The controller 603 can receive digital data from the network device 606 and convert it to corresponding sinusoidal variations for transmission as symbols over the data carrying light beam.

The VLC system 600 also includes an optical receiver such as a photodetector 203 or other light sensing device. The optical receiver can be located within the space such that it can detect the data carrying light beam within the information beam region 212. The intensity variations of the data carrying light beam can be converted to sinusoidal currents which can be converted to symbols by processing circuitry 612. For example, the processing circuitry 612 can convert the sinusoidal output to digital data, which can be communicated to a computing device 615 such as, but not limited to, a computer, laptop, tablet, or smart phone. In some implementations, the optical receiver and processing circuitry 612 can be combined in a single device or can be included as part of the computing device 615.

Bi-directional VLC can be established by co-locating both an optical receiver and an array of LED elements. For example, a light source (e.g., a ceiling fixture, lamp, etc.) can include one or more photodetectors 203 with processing circuitry 612 and an array of LED elements 203 with controller 603. The photodetectors 203 can be configured to detect data carrying light beams received from one or more directions. The controller 603 may be configured to determine the source location of the detected data carrying light beam and control the operation of the individual LED elements to establish a responding data carrying light beam. For instance, a computing device 615 can be coupled to a desk lamp configured to carry out VLC with, e.g., a light fixture mounted on a ceiling or wall around the lamp. In this way, a communication link can be established between the computing device 615 and a remotely located network device 606. Since the communications are limited to the information beam region 212, the link is secured from outside access.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to about 'y'" includes "about 'x' to about 'y'".

Therefore, at least the following is claimed:

1. A visible light communication (VLC) system, comprising:
    an array of light emitting diode (LED) elements configured to emit omni-directional light from individual LED elements of the array of LED elements; and
    control circuitry configured to control the individual LED elements to sinusoidally vary an intensity of the emitted omni-directional light from the individual LED elements, where a data carrying light beam is generated within an information beam region by constructively combining sinusoidal intensity variations of the emitted omni-directional light and a constant and uniform intensity light is generated outside the information beam region by destructively combining the sinusoidal intensity variations of the emitted omni-directional light.

2. The VLC system of claim 1, further comprising:
    an optical receiver configured to receive the data carrying light beam; and
    processing circuitry configured to convert the sinusoidal intensity variations of the data carrying light beam into corresponding digital symbols.

3. The VLC system of claim 1, wherein the optical receiver is a photodetector.

4. The VLC system of claim 1, wherein the control circuitry is configured to interface with a network device via a network.

5. The VLC system of claim 4, wherein the control circuitry is configured to convert digital symbols to corresponding sinusoidal variations for symbol transmission over the data carrying light beam.

6. The VLC system of claim 4, wherein the network is a hardwired local network.

7. The VLC system of claim 1, wherein the control circuitry is configured to control amplitude and phase of the sinusoidal intensity variations of the emitted omni-directional light from the individual LED elements to generate the data carrying light beam in a defined direction.

8. A visible light communication (VLC) system, comprising:
   an optical receiver configured to:
      detect sinusoidal intensity variations of a received data carrying light beam generated within an information beam region by constructively combining the detected sinusoidal intensity variations of omni-directional light emitted by an array of light emitting diode (LED) elements; and
      generate an output signal corresponding to the detected sinusoidal intensity variations; and
   processing circuitry configured to convert the output signal into digital symbols corresponding to the detected sinusoidal intensity variations.

9. The VLC system of claim 8, wherein the optical receiver is a photodetector.

10. The VLC system of claim 8, wherein the processing circuitry is configured to provide the digital symbols to a computing device communicatively coupled to the processing circuitry.

11. The VLC system of claim 8, wherein uniform intensity light is generated outside the information beam region by destructively combining the detected sinusoidal intensity variations of the omni-directional light emitted by the array of LED elements.

12. A light source comprising the visible light communication (VLC) system of claim 1 and the VLC system of claim 8.

13. The light source of claim 12, wherein the light source is a light fixture.

14. The light source of claim 12, comprising a plurality of optical receivers.

15. A method, comprising:
   illuminating a space with an array of light emitting diode (LED) elements that emit omni-directional light; and
   generating a data carrying light beam within an information beam region of the space by sinusoidally varying an intensity of the omni-directional light emitted from one or more LED elements of the array of LED elements, while simultaneously generating uniform intensity light outside the information beam region.

16. The method of claim 15, comprising:
   receiving data transmitted over a network; and
   transmitting the data via the data carrying light beam by modulating the intensity of the omni-directional light emitted from the one or more LED elements.

17. The method of claim 15, comprising controlling amplitude and phase of sinusoidal variations of the intensity to generate the data carrying light beam in a defined direction.

18. The method of claim 15, comprising:
   sensing intensity variations of the data carrying light beam; and
   generating an output signal corresponding to the intensity variations of the data carrying light beam.

19. The method of claim 16, comprising converting an output signal generated from sinusoidal intensity variations of the data carrying light beam into digital symbols corresponding to the data transmitted over the network.

20. The method of claim 15, wherein sinusoidal variations of the intensity of the omni-directional light constructively combine within the information beam region and destructively combine outside the information beam region.

* * * * *